United States Patent [19]

Ross et al.

[11] 3,883,648

[45] May 13, 1975

[54] METHOD OF MAKING STABLE GRANULES OF N-4-[2-(5-CHLORO-2-METHOXYBENZAMIDO)-ETHYL]-PHENYLSULFONYL-N'-CYCLOHEXYL UREA AND ITS SALTS AND PROCESS FOR PREPARING SAME

[75] Inventors: Gerhard Ross, Liederbach, Taunus; Bernhard Reul, Schneidhain, Taunus, both of Germany

[73] Assignee: Hoechst Aktiengesellschaft, Frankfurt am Main, Germany

[22] Filed: Oct. 29, 1973

[21] Appl. No.: 410,311

[30] Foreign Application Priority Data
Oct. 31, 1972 Germany............................ 2253318
Oct. 31, 1972 Germany............................ 2253317

[52] U.S. Cl. .................. 424/44; 264/117; 424/321
[51] Int. Cl............................................. A61k 27/12
[58] Field of Search ............... 424/44, 321; 264/117

[56] References Cited
UNITED STATES PATENTS

| | | | |
|---|---|---|---|
| 2,875,130 | 2/1959 | Grass et al. ............................ | 424/19 |
| 3,146,167 | 8/1964 | Lantz et al. ............................ | 424/22 |
| 3,361,632 | 1/1968 | Ross et al. ............................. | 424/22 |
| 3,374,146 | 3/1968 | Bucharz et al. ........................ | 424/19 |
| 3,670,065 | 6/1972 | Ericksson et al. ..................... | 264/131 |

FOREIGN PATENTS OR APPLICATIONS
1,952,304  5/1971  Germany

*Primary Examiner*—Shep K. Rose
*Attorney, Agent, or Firm*—Curtis, Morris & Safford

[57] ABSTRACT

A method of making stable granules of N-4-[2-(5-chloro-2-methoxybenzamido)-ethyl]-phenylsulfonyl-N'-cyclohexyl urea and salts thereof by dissolving or dispersing said materials in a melt of a water-soluble carrier material in the presence of an alkali metal carbonate or bicarbonate stabilizing the compound against the temperatures of the melt, and then solidifying the molten mass into droplet granules. Stable granules prepared according to this method and dosage unit forms comprising said granules.

4 Claims, No Drawings

METHOD OF MAKING STABLE GRANULES OF N-4-[2-(5-CHLORO-2-METHOXYBENZAMIDO)-ETHYL]-PHENYLSULFONYL-N'-CYCLOHEXYL UREA AND ITS SALTS AND PROCESS FOR PREPARING SAME

The present invention relates to medicinal dosage forms suitable for oral administration containing the very sparingly water-soluble N-4-[2-(5-chloro-2-methoxybenzamido)-ethyl]-phenylsulfonyl-N'-cyclohexyl urea (named in the following Glibenclamid) or its salts in a medicine-carrier combination soluble in the gastric juice. The invention also relates to a process for preparing same.

The very effective hypoglycemic sulfonyl urea Glibenclamid has a very low solubility in water or the gastric juice, i.e. 0.001 to 0.005 percent at 37°C.

In order to ensure an optimum start of action and an optimum duration of efficacy of oral preparations of Glibenclamid and its salts, the rate of dissolution of the medicament is increased, according to the state of the art, by finely grinding or microprecipitation and the finely divided active ingredient is processed into solid dosage forms such as tablets, dragees, capsules and the like.

A micro-precipitation or fine grinding mean expensive additional process steps necessary to obtain the active ingredient in optimum particle size. Especially grinding requires considerable technical expenditure to avoid dust formation of the highly active medicament.

It has now surprisingly been found that the aforesaid process steps to reduce the particle size of the active ingredient can be avoided and it can be obtained in dosage form in simple manner by dissolving or dispersing the medicine in molten water-soluble carrier materials, possibly together with surface-active substances, transforming the melt into granules and preparing medicinal dosage forms from the granules possibly with the addition of further auxiliaries.

In Journal Ph. Science, volume 58, page 1505 (1969) W. L. Chiou et al. have described the use of polyglycols to improve the rate of dissolution of various other active ingredients. The publication does not deal with the final dosage form of the medicines and combinations with surfaceactive additives are not mentioned.

The dosage forms according to the invention contain the active ingredient in most cases in the form of a solution in a readily water-soluble carrier medium and after intake it is thus immediately available for resorption in the amount given by the solubility or in the form of a supersaturated solution.

The added carrier materials may furthermore act as dissolving intermediary.

Suitable carrier materials are all substances which are capable of dissolving Glibenclamid in a concentration of at least 1 percent, are water-soluble, have a melting point above 50°C and are pharmacologically innocuous.

There are preferably used polyglycols having a molecular weight of from 2,000 to 20,000, optionally in the form of mixtures. Addition products of polyglycol and propylene oxide having a molecular weight of from 5,000 to 15,000 and mixtures thereof with polyglycols may also be used, the addition products of polypropylene glycol with ethylene oxide being preferred.

Further suitable carrier materials are acid amides, for example ethyl urea, sarcosine anhydride, oxethylated fatty acid amides, acids and acid anhydrides, for example glutaric acid or glutaric anhydride, or other eutectic mixtures.

As surface-active additives physiologically compatible ionic and non ionic substances can be used, preferably polyethylene glycol fatty acid esters.

Suitable additional water soluble auxiliaries are inorganic and organic salts, polymers such as polyvinyl pyrrolidone and sugar.

As the preparations according to the invention are produced at elevated temperature and, depending on the constitution of the carrier material, an optimum stability is not ensured in all cases, the Glibenclamid is suitably used in the form of a salt or alkaline substances with which Glibenclamid can form salts are added to the mixture of active ingredient, auxiliary and carrier material.

In these special systems, especially in the presence of polyglycols, well water-soluble organic salts, for example pyrrolidinium or piperidinium salts may have a poorer stability than the free acid Glibenclamid.

Therefore, inorganic salts, more particularly alkali metal salts of Glibenclamid and mixtures of Glibenclamid with alkaline or weakly alkaline substances, for example carbonates or bicarbonates, are especially suitable.

Moreover, the use of carbonates or bicarbonates additionally produces a buffer effect, for example in artificial gastric juice, and a loosening of the granule nucleus in an acid medium, which results in a better release of the active ingredient with disintegration of the dosage form under the action of carbon dioxide. The carbon dioxide set free from the carbonate or bicarbonate furthermore ensures a uniform fine distribution of the active ingredient in the stomach.

Hence, in a preferred embodiment of the invention Glibenclamid is dispersed or dissolved in the melt of the carrier material as specified above, an alkali metal or alkaline earth metal carbonate or bicarbonate is introduced into the melt, granules are prepared from melt which are then filled, for example, in a capsule.

The following table illustrates the stability of different Glibenclamid preparations containing as carrier material either a melt of polyglycol 4000 or of an addition product of polypropylene glycol with ethylene oxide. To define the stability the amount of decomposed active ingredient was determined after heating of the respective preparations for 1 hour at 85°C, a heating period which is not reached in the production.

| Carrier: polyglycol 4000 | % of decomposed active ingredient |
| --- | --- |
| Glibenclamid (free acid) | 4.0 |
| piperidinium salt of Glibenclamid | 30.0 |
| lithium salt of Glibenclamid | 0.6 |
| potassium salt of Glibenclamid | 0.4 |
| Glibenclamid+polyoxethylene-40-stearate | 17.0 |
| Glibenclamid (free acid)<br>+ polyoxethylene-40-stearate<br>+ potassium bicarbonate<br>(cf. Example 1) | 0.6 |

| Carrier: polypropyleneglycol-ethyleneoxide-addition-product | % of decomposed active ingredient |
| --- | --- |
| Glibenclamid (free acid) | 15.0 |
| Glibenclamid (free acid)<br>+ poly-oxethylene-40-stearate<br>+ potassium bicarbonate<br>(cf. Example 2) | 0.2 |

The data of the table clearly show that the inorganic salts of Glibenclamid and mixtures of Glibenclamid with alkali metal carbonates or bicarbonates in combination with carrier materials containing alcoholic groups and optionally with the addition of surface-active substances have a better stability than organic salts of Glibenclamid and the free acid itself with the same carrier materials.

The granules consisting of active ingredient and auxiliaries are prepared by the usual process by dry granulation, melt granulation or solvent granulation. They are prepared preferably in the device described in German Offenlegungsschrift No. 1,918,685 in droplet form.

The granules either in usual or in droplet form are preferably filled into hard gelatin capsules, however they can also be used for making compressed tablets, mostly with the addition of further auxiliaries having a disintegrating action.

The dosage forms according to the invention combine pharmaceutic and technologic advantages with a good therapeutic effect of the very sparingly water-soluble active ingredient to ensure an optimum and reliable bioavailability and resorption.

The following examples illustrate the invention.

EXAMPLE 1:

| | | |
|---|---|---|
| 1) | 1.47 g | of Glibenclamid |
| 2) | 79.10 g | of polyglycol 4,000 |
| 3) | 5.00 g | of poly-oxethylene-40-stearate |
| 4) | 14.43 g | of potassium bicarbonate |
| | 100.00 g | |

PREPARATION

Substances 1 to 3 were mixed and melted at a temperature of from 70° to 80°C until a clear solution had formed. Finely divided potassium bicarbonate 4) was then dispersed in the solution.

The melt was transformed into droplets in the device described in DOS 1.918.685. It could also be granulated in known manner after solidification.

The granules were filled into hard gelatin capsules in an amount of 170 mg each, corresponding to a dosage of 2.5 mg of Glibenclamid for each capsule.

EXAMPLE 2:

| | | |
|---|---|---|
| 1) | 1.47 g | of Glibenclamid |
| 2) | 79.10 g | of polypropylene glycol/ethylene oxide addition product (Pluronic (R) F 68; (Wyandotte, Chem. Corp. Michigan,USA) |
| 3) | 5.00 g | of polyoxethylene-40-stearate |
| 4) | 14.43 g | of potassium bicarbonate |
| | 100.00 g | |

PREPARATION

Substances 1) to 3) were mixed and melted at 70°–80°C until a clear solution had formed. The finely divided potassium bicarbonate 4) was then dispersed in the solution.

The melt was transformed into droplets in the device described in DOS 1,918,685 or granulated in known manner after solidification.

The granules were filled into hard gelatin capsules in an amount of 170 mg each, corresponding to a dosage of 2.5 mg of Glibenclamid for each capsule.

What is claimed is:

1. A method for making stable granules of N-4-[2-(5-chloro-2-methoxybenzamido)ethyl]-phenylsulfonyl-N'-cyclohexyl urea or a physiologically compatible salt thereof which comprises preparing a solution or a dispersion of said compound or salt in a melt of a water-soluble carrier material selected from the group consisting of polyglycols having a molecular weight of from 2000 to 20000, addition products thereof with propylene oxide, and mixtures of said polyglycols or addition products with pharmacologically compatible surface-active substances, together with at least an amount of an alkali metal carbonate or bicarbonate effective to stabilize said compound or salt against the temperatures of the melt, and then solidifying the molten mass into droplet granules.

2. A stable granule prepared according to claim 1.

3. A tablet comprising compressed stable granules according to claim 2.

4. A hard gelatin capsule filled with a plurality of the stable granules according to claim 2.

* * * * *